Nov. 26, 1940.   A. E. BAAK   2,222,600
TEMPERATURE CONTROL SYSTEM
Filed Oct. 26, 1938
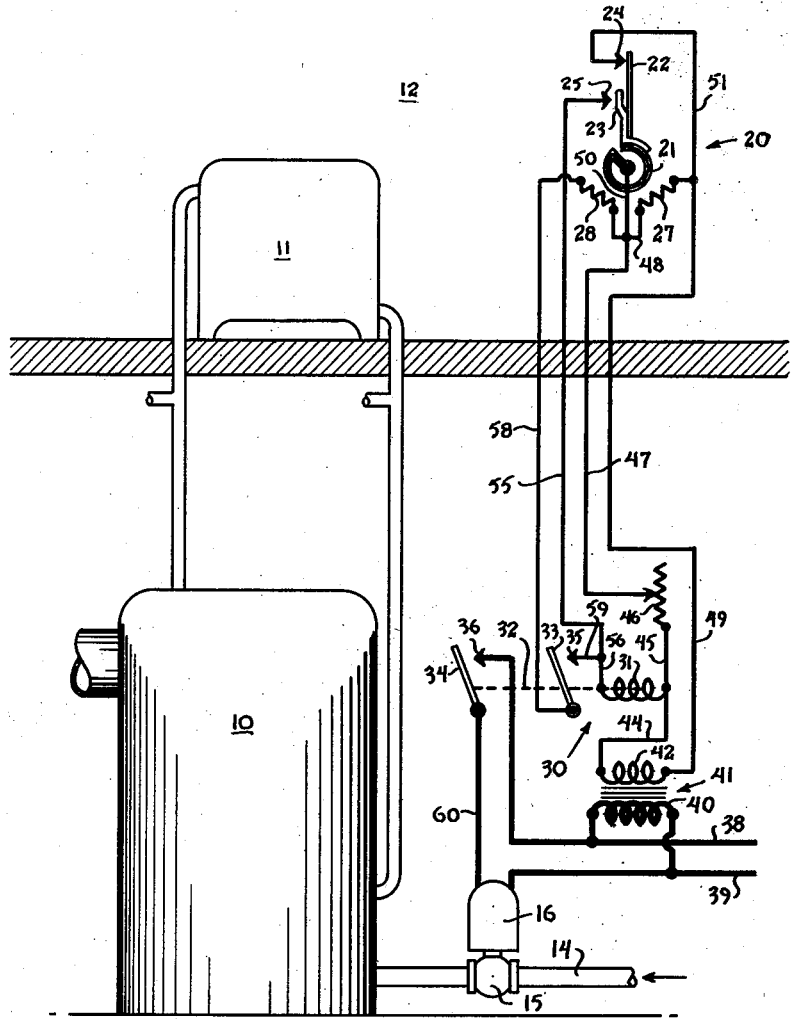
Inventor
Albert E. Baak
By George H. Fisher
Attorney Patented Nov. 26, 1940

2,222,600

UNITED STATES PATENT OFFICE 2,222,600

TEMPERATURE CONTROL SYSTEM

Albert E. Baak, Minneapolis, Minn., assignor to Minneapolis-Honeywell Regulator Company, Minneapolis, Minn., a corporation of Delaware Application October 26, 1938, Serial No. 237,045

8 Claims. (Cl. 236—68)

This invention relates to a temperature control system and more particularly to a heating system.

One of the inherent characteristics of all heating systems is the fact that a certain time elapses between the time that the heating plant is put in operation and the time that the temperature of the space being heated starts to rise. This time lag is due to the time necessary to generate heat in the furnace or heat source and the time necessary for the heat generated to arrive in the space being heated. Where the system is controlled by a simple temperature responsive switch, it is difficult to maintain the temperature within desired limits by reason of this time lag of the system, since the heat will continue to flow to the space after the thermostat has become satisfied by reason of the residual heat stored in the heating system. This results in the temperature of the space "overshooting" or rising above the setting of the thermostat, and in order to overcome this difficulty the heating plant should be shut down before the temperature of the space has reached the desired value, so that the heat stored up in the system may be utilized to bring the space temperature up to the desired value. One method of accomplishing this result is by the use of a heater located in proximity to the thermostat to raise the temperature thereof above the space temperature, this heater being energized when the temperature of the space starts to rise so that the thermostat will shut down the heating plant before the space temperature actually reaches the desired value, in this way anticipating the arrival of additional heat in the space and eliminating the objectionable "overshooting" of the space temperature.

While this overshooting of the space temperature has thus been effectively reduced or avoided, the lag of the heating system also makes its effect apparent and causes another objectionable condition known as "undershooting." Thermostats are generally constructed with an appreciable operating differential in order that jarring of the contacts by reason of vibrations in the building, etc., will not initiate operation of the heating plant when the space temperature is at the desired value. Accordingly, after the space temperature has been at the desired value for an appreciable length of time, and then starts to drop, the heating plant will not start operating to increase the temperature of the space until the temperature of the space has dropped by an amount equal to the operating differential of the thermostat. Due to the lag in the heating system, the space temperature may continue to fall after the heating plant has been placed in operation by an amount that depends on the heating load on the system. The space temperature may therefore drop below the desired temperature sufficiently to cause an uncomfortable condition in the space. Accordingly, while the use of a heater in conjunction with the thermostat as described above effectively eliminates the overshooting of the space temperature, the objectionable "undershooting" of the space temperature may still take place with the result that the temperature of the space still fluctuates more than is desirable.

In accordance with my invention, it is possible to anticipate both a rise in the space temperature and a drop in the space temperature in such a manner that the space temperature is maintained within very close limits, while at the same time using a thermostat having an operating differential which is greater than the actual fluctuations in the space temperature. For example, the thermostat may have an operating differential of 2¾° F., while the space temperature is not allowed to fluctuate more than ¼° F. by effectively anticipating both a rise and a fall in the space temperature, this being accomplished by a novel arrangement and operation of heating means positioned adjacent the thermostat.

It is therefore an object of my invention to provide a temperature control system wherein an increase in the temperature of the space whose temperature is being controlled and a decrease in the temperature of the space is anticipated in such a manner that the temperature of the space is maintained within very close limits.

More particularly it is an object of my invention to provide a heating system controlled by a space thermostat having provision for anticipating both a rise and a fall in temperature of the space in such a manner as to compensate for the lag in the heating system to maintain the temperature of the space substantially constant.

Other objects and advantages will become apparent upon reference to the specification, claims and appended drawing wherein is illustrated a preferred embodiment of my invention.

Referring more particularly to the drawing, a furnace 10 is illustrated for supplying heating medium to a radiator 11 located in a space 12 to be heated. The furnace 10 may be a hot water or steam furnace or if desired this furnace may be a hot air furnace although the principles of my invention are more particularly applicable to an indirect heating system because of the greater lag of this type of a system. Fuel may be supplied to the furnace 10 by means of a pipe 14, the flow of fuel through this pipe being controlled by a valve 15. A solenoid 16 or other suitable means may be provided for controlling the position of the valve 15 and when this solenoid is energized the valve 15 is moved to open position to permit the flow of fuel to the furnace 10. Upon deenergization of the solenoid 16, the flow of fuel to the furnace is interrupted.

Located within the space 12 is a thermostat indicated generally by the reference character 20 and this thermostat is shown to comprise a bimetallic element 21 to which are suitably connected movable contact members 22 and 23. Cooperating with the contact members 22 and 23 are the fixed contacts 24 and 25. These contacts are so arranged with respect to the movable contacts that upon a fall in temperature in the space 12, contact member 22 is moved by the bimetallic element 21 into engagement with the fixed contact 24, and upon a further drop in temperature in the space the contact 23 is moved into engagement with the fixed contact 25. As the temperature in the space increases, the contact members 22 and 23 move out of engagement with the fixed contacts in reverse order. Located closely adjacent the bimetallic element 21 is a pair of heating elements 27 and 28. These elements may if desired be wound around the bimetallic element 21 and are arranged to raise the temperature of the bimetallic element above the temperature of the space 12 when these elements are energized.

The valve 16 is controlled by a relay 30 which is in turn controlled by the thermostat 20. This relay may comprise a relay coil 31 with which is associated an armature 32 operatively connected to the switch arms 33 and 34 which cooperate with the fixed contacts 35 and 36, respectively. Upon energization of the relay coil 31, the armature 32 is attracted toward the right and moves the switch arms 33 and 34 into engagement with the fixed contacts 35 and 36, and upon deenergization of the coil 31 the arms 33 and 34 move out of engagement with their respective contacts under the influence of gravity or any suitable biasing means (not shown).

Line wires 38 and 39 are provided for conveying power to the valve motor 16, these wires being connected to a suitable source of power (not shown). Connected across the line wires 38 and 39 is the primary 40 of a step-down transformer 41, this transformer also including a low tension secondary 42 which supplies power to the relay 30 and the heaters 27 and 28 of the thermostat 20.

With the parts in the positions illustrated, the space thermostat 20 is satisfied, or in other words, is not calling for heat in the space 12. In this position of the thermostat, the relay 30 is deenergized which in turn causes the solenoid 16 to be deenergized and the valve 15 to be maintained in closed position whereupon fuel is not being supplied to the furnace by means of the pipe 14, or may be supplied in a small quantity only. The heater 27 located adjacent the bimetallic element 21 is energized by means of the following circuit: from one side of the transformer secondary 42 through conductors 44, 45, adjustable resistance 46, conductors 47, 48, heater 27, and conductor 49 to the other side of the secondary 42. Heat is accordingly being supplied to the thermostat 20 so that the temperature of the bimetallic element is somewhat higher than the space temperature.

If the space temperature should begin to drop, the arm 22 carried by the bimetallic element 21 will move into engagement with the contact 24 and close a shunt circuit for the heating element 27, this circuit being as follows: from the transformer secondary 42 through conductors 44, 45, adjustable resistance 46, conductors 47, 50, bimetallic element 21, contact member 22, contact 24, and conductors 51 and 49 to the other side of secondary 42. The establishment of this shunt circuit reduces the current flow through the heater 27 whereupon this heater cools off and accordingly the bimetallic element 21 will begin to cool at a rate which is more rapid than the rate at which the temperature in the space 12 drops. The purpose of the adjustable resistance 46 is to prevent a short circuit across the transformer secondary 42 as will be apparent. As the temperature of the bimetallic element 21 now begins to fall rapidly, the contact member 23 will move into engagement with the fixed contact 25 and close a circuit through the relay coil 31 as follows: from one side of the transformer 42 through conductors 49, 51, contacts 24, 22, 23 and 25, conductors 55, 56, relay coil 31 and conductor 44 to the other side of secondary 42. At this time the heater 27 is still shunted out by the aforedescribed circuit so that the temperature of the bimetallic element 21 will be substantially the same as that of the space 12.

Energization of relay 30 causes arms 33 and 34 to be moved into engagement with contacts 35 and 36, the engagement of arm 33 with contact 35 forming a maintaining circuit for the relay coil 31 which is independent of engagement of contact member 23 with the fixed contact 25, this circuit being as follows: from transformer secondary 42, through conductors 49, 51, contact 24, contact member 22, bimetallic element 21, conductor 50, heater element 28, conductor 58, relay arm 33, contact 35, conductors 59 and 56, relay coil 31, and conductor 44 to the other side of the secondary 42. It will thus be seen that once the relay coil 31 has been energized, it will remain energized as long as the arm 22 of the thermostat 20 remains in engagement with the contact 24. It will also be noted that this maintaining circuit includes the heating element 28 but this heating element will be shunted out by the original energizing circuit for the relay 30 as long as contact arm 23 of the thermostat remains in engagement with the fixed contact 25. Energization of relay 30 closes a circuit to the solenoid 16 as follows: from the line wire 38 through contact 36, switch arm 34, conductor 60, solenoid 16 to the line wire 39. Energization of this solenoid 16 opens the valve 15 whereupon the temperature of the heating medium in the furnace is increased and the radiator 11 accordingly causes an increase in the space temperature 12. Due to the heating lag of the system, the temperature of the space may not start to rise for an appreciable length of time but as soon as the temperature rises above the value at which the contact member 23 of the thermostat engages the fixed contact 25, the original energizing circuit for the relay will be broken at this point so that the relay will be energized only by the maintaining circuit which includes the heater 28. Accordingly, after this original rise in space temperature, the heater 28 will be energized whereupon the temperature of the bimetallic element 21 will increase faster than the increase in the space temperature thus causing the contact member 22 of the thermostat 20 to move away from the contact 24 prior to the time that it normally would if the heater 28 were not present. In this way the arrival of heat in the space is anticipated by the thermostat after the space temperature begins to rise and the lag in the heating system is effectively compensated.

As soon as the temperature of the bimetallic element 21 has been increased sufficiently so that the arm 22 moves away from the contact 24, the relay 30 is deenergized which in turn deenergizes the solenoid 16 to reduce the supply of heat to the space 12. As soon as the arm 22 moves away from the contact 24, the shunt circuit around the heater 27 is broken so this heater begins to heat up and maintain the temperature of the bimetallic element at the same value as long as the space temperature does not fluctuate. As soon as there is a slight drop in the space temperature and arm 22 of the thermostat moves into engagement with the contact 24, the heater 27 will cool down as previously described so that the contact 23 will engage the contact 25 before there has been any substantial drop in the space temperature to again open the valve 15 and supply additional heat to the space 12. In this manner, the thermostat 20 anticipates both a drop in temperature and a rise in temperature of the space before the space temperature has actually dropped or risen any appreciable amount so as to compensate for the heating lag of the system and thus reduce overshooting and undershooting.

Assume that the thermostat without the heaters has a normal differential of 2¾°. In other words, without the heaters the arm 22 would engage the contact 24 at 75° room temperature and the arm 23 would engage the contact 25 at 72¼°. If the heaters 27 and 28 are each designed to supply three degrees of heat to the bimetallic element 21 when energized, it will be seen that the thermostat may actually maintain the space temperature within one quarter degree of the desired temperature. Thus if the space temperature is 72° and the thermostat is satisfied, the temperature of the bimetallic element will be maintained at 75° by the heater 27. As soon as the temperature drops slightly below 72° and arm 22 engages contact 24, the heater 27 will be deenergized and the thermostat will therefore cool down three degrees, or in other words, to 72° whereupon arm 23 will engage contact 25 and initiate operation of the heating plant. As soon as the temperature in the space rises a fraction of a degree above 72°, arm 23 moves away from contact 25 whereupon heater 28 is energized and supplies three degrees of heat to raise the temperature back to 75° and open the relay circuit at the contacts 22 and 24. In other words, while the thermostat has a differential of approximately three degrees, it is able by reason of the novel arrangements of the heaters 27 and 28 to anticipate both the arrival of both a rise and a drop in the space temperature in a manner to maintain the temperature of the space within approximately one quarter of a degree of the desired value.

While I have shown one preferred form of my invention, it should be obvious that it is capable of modification. It should be obvious, for example, that instead of controlling the flow of fuel to the furnace as by a valve 15, the thermostat might be arranged to control check and draft dampers on a coal fired furnace, to control an oil burner, or any other type of heating plant. It should also be obvious that the principles of my invention are applicable with any type of heating system although the heating lags in different types of systems are different so that the heat capacities of the heaters 27 and 28 should be adjusted for the particular installation. Adjustable rheostats may of course be inserted wherever desired to control the heating effects of these heaters and it should also be apparent that these heaters might take the form of a single heater having a center tap connection to the thermostat 20. Many other modifications of my invention may become apparent to those skilled in the art and I therefore I wish it to be understood that my invention is limited only by the scope of the appended claim.

I claim as my invention:

1. In a system of the class described, a space temperature changing means, a space thermostat in control of said temperature changing means, means including said thermostat for causing an increase in the temperature changing effect of the temperature changing means at a thermostat temperature different from that at which a decrease in the temperature changing effect of the temperature changing means is caused, means for normally maintaining the temperature of the thermostat at a temperature different from the temperature of the space, means including said thermostat responsive to a change in the space temperature to a predetermined value to interrupt operation of said temperature maintaining means whereby the temperature of said thermostat approaches the space temperature and causes an increase in the temperature changing effect of the temperature changing means, and means controlled by said thermostat responsive to either an increase or a decrease in the space temperature to a value between the temperatures at which the temperature changing effect of the temperature changing means is increased and that at which the temperature changing effect is decreased for causing the temperature of the thermostat to vary in the direction that the space temperature is being varied by the temperature changing means at a rate faster than said space temperature is being varied.

2. In a system of the class described, a space heating means, a space thermostat in control of said heating means, local heating means for raising the temperature of said thermostat above the space temperature, means including said thermostat responsive to a drop in the space temperature to a predetermined value to interrupt operation of the local heating means whereby the temperature of the thermostat drops faster than the space temperature, means including said thermostat responsive to a drop in temperature of said thermostat to a predetermined value to increase the heating effect of said space heating means, and means including said thermostat responsive to a rise in the temperature of said thermostat occasioned by a rise in space temperature above said predetermined value to cause operation of said local heating means whereby the temperature of said thermostat is caused to rise more rapidly than the space temperature to a value wherein the heating effect of said space heating means is caused to decrease.

3. In a control system of the class described, a space heating means, thermostatic means in control of said space heating means and including a pair of movable contact members arranged to sequentially engage a pair of fixed contact members in response to a drop in space temperature, means for causing an increase in the heating effect of said heating means in response to engagement of both of the fixed contact members by the movable contact members, means for causing the heating means to operate to raise the temperature of the space until both of the contact members have moved away from the fixed contacts, whereupon the heating effect of the heating means is decreased, local heating means located adjacent the thermostatic means for raising the temperature thereof above the space temperature, means for energizing said heating means only when both of said contact members are out of engagement with the cooperating fixed contacts and when one of the movable contact members is out of engagement with the cooperating fixed contact but the space heating means is operating to increase the space temperature.

4. In a control system of the class described, thermostatic means having a pair of movable contact members, fixed contacts cooperating with said contact members and arranged to be sequentially engaged thereby in response to a drop in the ambient temperature, first and second heating means located closely adjacent said thermostatic means and arranged, when energized, to raise the temperature of said thermostatic means above the space temperature, means for energizing one of said heating means when both of said contact members are out of engagement with said fixed contacts, and means for energizing the other of said heating means only after both of said contact members have been in engagement with said fixed contacts and the space temperature has risen sufficiently to cause the first to be disengaged of said contact members to move out of engagement with the cooperating fixed contact.

5. In a control system of the class described, thermostatic means having a pair of movable contact members, fixed contacts cooperating with said contact members and arranged to be sequentially engaged thereby in response to a drop in the ambient temperature, first and second heating means located closely adjacent said thermostatic means and arranged, when energized, to raise the temperature of said thermostatic means above the space temperature, means for energizing one of said heating means when both of said contact members are out of engagement with said fixed contacts, space heating means, means responsive to engagement of both of said contact members with the fixed contacts for causing an increase in the heating effect of the space heating means, means for operating the heating means to increase the space temperature until both of said contact members move out of engagement with the fixed contacts, and means for energizing the other of said heating means after the last of the movable contact members to engage a fixed contact has moved away from the fixed contact.

6. In a system of the class described, a thermostat responsive to the temperature of a space to be heated, said thermostat including a pair of movable contact members arranged to sequentially engage a pair of fixed contacts in response to a drop in temperature at said thermostat, a pair of electrical heating means mounted in heating relationship with said thermostat to raise the temperature thereof above the space temperature, one of said heating means being permanently connected to a source of power, means responsive to engagement of the first of said movable contact members to engage a fixed contact member with the said fixed contact member to shunt said heating means whereby it has substantially no heating effect on said thermostat, space heating means, means responsive to engagement of both movable contact members with the fixed contacts to increase the heating effect of said space heating means, circuit connections for causing such increase in the heating effect of said space heating means until both movable contact members have moved away from the fixed contacts, said circuit connections including the second electrical heating means.

7. In a system of the class described, a space thermostat including a first movable contact arranged to engage a fixed contact upon a drop in temperature of the thermostat to a first predetermined value and a second movable contact arranged to engage a second fixed contact upon a drop in temperature of the thermostat to a lower predetermined value, first and second electrical heaters arranged, when energized, to raise the temperature of the thermostat above the space temperature, the first of said electrical heaters being permanently connected to a source of power, means responsive to engagement of the first movable contact with the fixed contact for establishing a shunt circuit around said first electrical heater, a controlled device, means responsive to engagement of both movable contacts with the fixed contacts for energizing said controlled device, means responsive to energization of said controlled device for establishing a maintaining circuit therefor which is independent of the engagement of the second movable contact with the second fixed contact but includes the first movable contact and the cooperating fixed contact, whereby the controlled device remains energized until both movable contacts have moved out of engagement with the fixed contacts, and means for energizing said second electrical heater when the controlled device is energized solely by said maintaining circuit.

8. In a system of the class described, a space thermostat including a first movable contact arranged to engage a fixed contact upon a drop in temperature of the thermostat to a first predetermined value and a second movable contact arranged to engage a second fixed contact upon a drop in temperature of the thermostat to a lower predetermined value, first and second electrical heaters arranged, when energized, to raise the temperature of the thermostat above the space temperature, the first of said electrical heaters being permanently connected to a source of power, means responsive to engagement of the first movable contact with the fixed contact for establishing a shunt circuit around said first electrical heater, a controlled device, means responsive to engagement of both movable contacts with the fixed contacts for energizing said controlled device, means responsive to energization of said controlled device for establishing a maintaining circuit therefor which is independent of the engagement of the second movable contact with the second fixed contact but includes the first movable contact and the cooperating fixed contact, whereby the controlled device remains energized until both movable contacts have moved out of engagement with the fixed contacts, said maintaining circuit including said second electrical heater, and space heating means operated by said controlled device.

ALBERT E. BAAK.